United States Patent
Guillot

(10) Patent No.: US 7,675,194 B2
(45) Date of Patent: Mar. 9, 2010

(54) DEVICE FOR POWERING EQUIPMENT, AND AN EQUIPMENT POWER SUPPLY SYSTEM

(75) Inventor: François Guillot, Fresnes (FR)

(73) Assignee: Sagem Defense Securite, Paris (FR)

( * ) Notice: Subject to any disclaimer, the term of this patent is extended or adjusted under 35 U.S.C. 154(b) by 246 days.

(21) Appl. No.: 10/950,596

(22) Filed: Sep. 28, 2004

(65) Prior Publication Data

US 2005/0068700 A1    Mar. 31, 2005

(30) Foreign Application Priority Data

Sep. 29, 2003   (FR) .................................. 03 11356

(51) Int. Cl.
*H02J 3/38* (2006.01)
*H02J 7/00* (2006.01)

(52) U.S. Cl. .............................. 307/26; 307/23; 307/28; 307/46; 307/48; 320/138; 323/259

(58) Field of Classification Search .................. 307/45, 307/46, 18, 23, 25, 26, 28, 29, 48; 320/138; 323/259
See application file for complete search history.

(56) References Cited

U.S. PATENT DOCUMENTS

| | | | | |
|---|---|---|---|---|
| 5,610,450 A | * | 3/1997 | Saeki et al. ..................... 307/46 |
| 5,721,481 A | * | 2/1998 | Narita et al. ................. 320/111 |
| 6,075,345 A | * | 6/2000 | Lee ............................. 320/138 |
| 6,192,687 B1 | | 2/2001 | Pinkerton et al. |
| 6,225,708 B1 | | 5/2001 | Furukawa et al. |
| 6,311,279 B1 | * | 10/2001 | Nguyen ....................... 713/300 |
| 6,456,508 B1 | * | 9/2002 | Namai et al. .................. 363/17 |
| 6,465,984 B2 | * | 10/2002 | Fukuoka et al. ............. 320/112 |
| 6,624,533 B1 | * | 9/2003 | Swanson et al. .............. 307/64 |
| 6,795,322 B2 | * | 9/2004 | Aihara et al. ................. 363/37 |
| 6,902,837 B2 | * | 6/2005 | McCluskey et al. ............ 429/9 |
| 7,053,502 B2 | * | 5/2006 | Aihara et al. ................. 307/46 |
| 7,339,809 B2 | * | 3/2008 | Bennett et al. .............. 363/163 |
| 2001/0035735 A1 | | 11/2001 | Fukuoka et al. |
| 2004/0053082 A1 | * | 3/2004 | McCluskey et al. ............ 429/9 |

* cited by examiner

*Primary Examiner*—Jared J Fureman
*Assistant Examiner*—Hal I Kaplan
(74) *Attorney, Agent, or Firm*—Muncy, Geissler, Olds & Lowe, PLLC

(57) ABSTRACT

A power supply device for powering equipment from at least one network supplying AC and at least one battery supplying DC, the power supply device comprising:
a first branch that is connected to the main network and that comprises a transformation member for transforming the AC voltage into an equivalent DC voltage;
a second branch that is connected to the battery and that comprises a voltage booster for raising the DC voltage supplied by the battery to an output voltage close to the DC voltage equivalent to the AC voltage;
the first branch and the second branch being connected by a switch member to a converter arranged to transform the DC voltage equivalent to the AC voltage of the network into at least one DC voltage for powering the equipment.

16 Claims, 1 Drawing Sheet

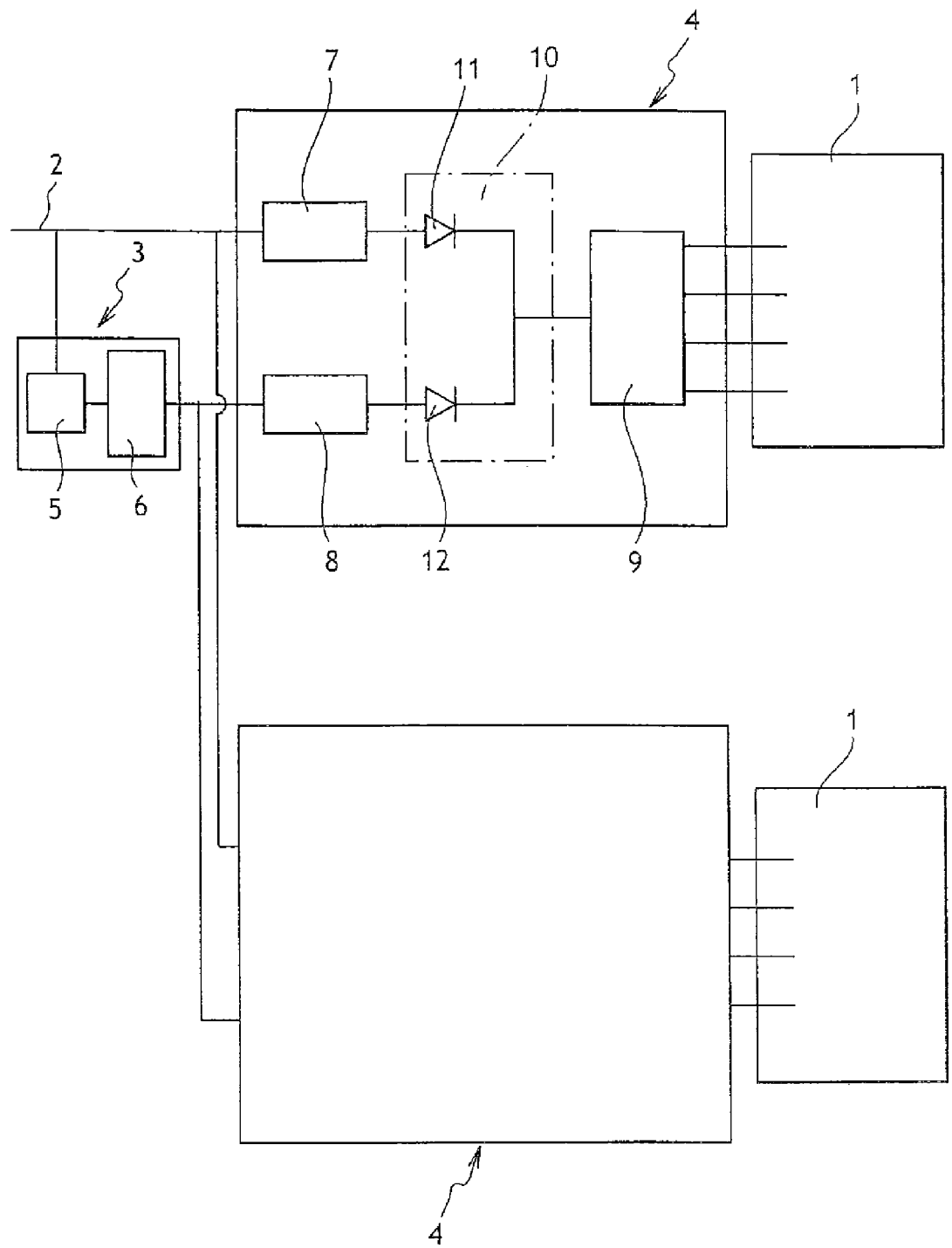

DEVICE FOR POWERING EQUIPMENT, AND AN EQUIPMENT POWER SUPPLY SYSTEM

This Non-provisional application claims priority under 35 U.S.C. §119(a) on Patent Application No(s). 0311356 filed in France on Sep. 29, 2003, the entire contents of which are hereby incorporated by reference.

The present invention relates to a device for powering equipment such as equipment on board a vehicle, and in particular an airplane. The invention also provides an equipment power supply system.

BACKGROUND OF THE INVENTION

In order to increase the quality of the work provided by aircraft crews and the comfort of their passengers, airplane builders are tending to implant computer servers in airplanes, e.g. in order to enable the crew to access data relating to the flight and/or to enable passengers to access programs for entertainment or amusement.

In an airplane, the onboard electrical equipment is generally powered by electricity produced by one or more alternators driven by the engine(s) of the airplane.

The operating constraints on the alternators mean there is a risk of the voltage on the power supply network dropping out for periods that may be as long as 200 milliseconds (ms).

Unfortunately, in computer servers such voltage dropouts can lead to a sudden loss of service, possibly accompanied by a loss of data.

In order to obviate that drawback, it is known, when using such networks that present such voltage dropouts, to connect each computer server to the power supply network via a battery associated with special electronics for keeping the battery charged by the network. An inverter is interposed between the battery and the server to reproduce the alternating current (AC) that normally powers the computer server. Computer servers are then no longer affected by any fluctuations in voltage that might occur on the power supply network. Nevertheless, such an architecture presents efficiency that is mediocre under normal operating conditions. In addition, increasing the number of batteries leads to a large increase in weight and in bulk, which is penalizing for use in an airplane.

OBJECT OF THE INVENTION

An object of the invention is to provide an improved device for powering equipment from a network and a battery, which device presents good efficiency in normal operation.

BRIEF SUMMARY OF THE INVENTION

To this end, the invention provides a power supply device for powering equipment from at least one network supplying AC and at least one battery supplying DC, the power supply device comprising:
- a first branch that is connected to the network and that comprises a transformation member for transforming the AC voltage into an equivalent DC voltage;
- a second branch that is connected to the battery and that comprises a voltage booster for raising the DC voltage supplied by the battery to an output voltage close to the DC voltage equivalent to the AC voltage;
- the first branch and the second branch being connected by a switch member to a converter arranged to transform the DC voltage equivalent to the AC voltage of the network into at least one DC voltage for powering the equipment.

Thus, in normal operation, the converter is powered via the first branch so that the power supply efficiency is the product of the efficiency of the transformation member multiplied by the efficiency of the converter. This results in optimum efficiency in normal operation.

Preferably, the output voltage from the voltage booster is slightly lower than the output voltage from the transformation member of the first branch, and the switch means is an OR cell having diodes.

Thus, the first branch powers the converter so long as the voltage output by the transformation member is greater than the voltage output by the voltage booster, and switching to the second branch occurs automatically as soon as the voltage output by the transformation member becomes less than the voltage output by the booster. That mode of switching is particularly simple and reliable.

The invention also provides a system for powering at least two pieces of equipment from at least one network supplying AC, the system comprising at least one battery together with power supply devices of the above-specified type, each connected to the network, to the battery, and to a respective one of the pieces of equipment.

Connecting the various pieces of equipment to a common battery serves to limit the weight and the volume of the battery required on board.

Other characteristics and advantages of the invention will appear on reading the following description of a particular and non-limiting embodiment of the invention.

BRIEF DESCRIPTION OF THE DRAWING

Reference is made to the sole accompanying FIGURE which is a diagram of an equipment power supply circuit.

DETAILED DESCRIPTION OF THE INVENTION

With reference to the FIGURE, the power supply system of the invention is described herein in an application to powering a computer server 1 on board an airplane having engines driving alternators of an electricity supply network 2. The alternators deliver AC at a root mean square (rms) voltage of 115 volts (V).

The power supply system of the invention comprises a common auxiliary power supply unit 3 connected to the network 2, and respective power supply devices 4 associated with each computer server 1 and each connected both to the common unit 3 and to the network 2.

The common unit 3 comprises a charger 5 connected to the network 2 and to a battery 6 in order to charge it. The charger 5 is conventional and serves to convert the AC of the network 2 into direct current (DC) used for producing a current feed for keeping the battery 6 charged. In this case, the battery 6 delivers DC at 28 V.

Each power supply device 4 comprises a first branch which is connected to the network 2 and a second branch which is connected to the battery 6 of the common unit 3.

The first branch comprises a transformation member 7 for transforming the AC of the network 2 into equivalent DC. The transformation member 7 is arranged in conventional manner to rectify and filter the AC of the network 2, e.g. to deliver DC regulated at 200 V which is equivalent to the 115 V rms of the network 2. In this case, the transformation member 7 includes in particular a conventional corrector circuit for correcting the waveform of the induced current and the phase of said current relative to the voltage that produces said current.

The second branch comprises a voltage booster 8 which raises the DC delivered by the battery 6 to an output DC at a voltage close to the DC that is equivalent to the rms voltage from the network 2. Specifically, the output voltage from the voltage booster 8 is slightly smaller than the output voltage from the transformation member 7. Thus, if the output voltage from the transformation member 7 is regulated at 200 V±10%, the output voltage from the voltage booster 10 is preferably set at 180 V.

The first and second branches are connected to a converter 9 via a switch member 10.

The converter 9 is a DC/DC chopper converter designed to transform the DC equivalent to the rms voltage of the network 2 into the DC voltages required for powering the central unit of the server 1.

The switch member 10 is an OR cell which comprises one diode 11 connected to the first branch and another diode 12 connected to the second branch.

In this way, in normal operation, while the network 2 is delivering AC at 115 V, the voltage output by the transformation member 7 is greater than the voltage output by the voltage booster 8 so that only the diode 11 conducts. The first branch thus powers the converter 9.

In the event of the network 2 failing, e.g. during an interruption of electrical power supply, the voltage output by the transformation member 7 becomes less than the voltage output by the voltage booster 8. The diode 12 then automatically becomes the only diode that is conducting and the second branch then powers the converter 9. The electrical energy supplied to the converter 9 by the battery 6 can be used, for example, for implementing the procedure for shutting down operation of the servers 1 normally.

Naturally, the invention is not limited to the embodiment described, and various embodiments can be applied thereto without going beyond the ambit of the invention as defined by the claims.

In particular, the invention is applicable to powering equipment other than computer servers.

Furthermore, the vehicle on which the power supply system is installed may have a plurality of AC distribution networks and of DC distribution networks. The power supply device may then be connected to one or more of the networks.

Furthermore, the numerical values specified are given purely by way of indication and can be modified, for example, as a function of the power levels to be delivered.

The battery 6 may also be charged using an external power supply when the vehicle is at rest.

In a variant, it is possible to connect a conventional protection device between the battery 6 and the second branches of the power supply devices in order to protect the second branches against excess currents of small value and relatively long duration, and excess voltages of large magnitude and of relatively short duration. One such device measures current and, in the event of a parameterizable threshold being crossed, disconnects the 28 V output after a predetermined duration.

What is claimed is:

1. A power supply system, comprising:
    at least two pieces of equipment;
    one network supplying AC;
    a single battery supplying DC and connected to said network; and
    a plurality of power supply devices, each power supply device connected to the network, to the battery, and to a respective one of the pieces of equipment, each power supply device comprising:
    a first branch that is connected to the network and that comprises a transformation member for transforming the AC voltage into an equivalent DC voltage;
    a second branch that is connected to the battery and that comprises a voltage booster for raising the DC voltage supplied by the battery to an output voltage close to the DC voltage of the first branch; and
    the first branch and the second branch being connected by a switch member to a converter arranged to transform the DC voltage from the switch member into at least one DC voltage for powering the equipment.

2. A power supply system according to claim 1, wherein the output voltage from the voltage booster is lower than the output voltage from the transformation member of the first branch, and the switch member is an OR cell having diodes.

3. A power supply system according to claim 1, wherein the battery is connected to the network to be recharged thereby.

4. A power supply system according to claim 1, wherein the transformation member is arranged to rectify and filter the AC voltage to obtain the equivalent DC voltage which is higher than the AC voltage.

5. A power supply system according to claim 4, wherein the AC voltage is about 115 V and the equivalent DC voltage is about 200 V.

6. A power supply system according to claim 5, wherein the equivalent DC voltage is about 200 V±10%.

7. A power supply system according to claim 6, wherein the booster output voltage close to the equivalent DC voltage is 180 V.

8. A power supply system according to claim 4, the voltage supplied by the battery is about 28 V.

9. An aircraft power supply system, comprising:
    at least two pieces of equipment;
    an alternator connected to one network supplying AC;
    a single battery supplying DC and connected to said network; and
    a plurality of power supply devices, each power supply device connected to the network, to the battery, and to a respective one of the pieces of equipment, each power supply device comprising:
    a first branch that is connected to the network and that comprises a transformation member for transforming the AC voltage into an equivalent DC voltage;
    a second branch that is connected to the battery and that comprises a voltage booster for raising the DC voltage supplied by the battery to an output voltage close to the DC voltage of the first branch; and
    the first branch and the second branch being connected by a switch member to a converter arranged to transform the DC voltage from the switch member into at least one DC voltage for powering the equipment.

10. An aircraft power supply system according to claim 9, wherein the output voltage from the voltage booster is lower than the output voltage from the transformation member of the first branch, and the switch member is an OR cell having diodes.

11. An aircraft power supply system according to claim 9, wherein the battery is connected to the network to be recharged thereby.

12. An aircraft power supply system according to claim 9, wherein the transformation member is arranged to rectify and filter the AC voltage to obtain the equivalent DC voltage which is higher than the AC voltage.

13. An aircraft power supply system according to claim 12, wherein the AC voltage is about 115 V and the equivalent DC voltage is about 200 V.

14. An aircraft power supply system according to claim 13, wherein the equivalent DC voltage is about 200 V±10%.

15. An aircraft power supply system according to claim 14, wherein the booster output voltage close to the equivalent DC voltage is 180 V.

16. An aircraft power supply system according to claim 15, wherein the voltage supplied by the battery is about 28 V.

\* \* \* \* \*